(12) United States Patent
Lin et al.

(10) Patent No.: US 11,331,583 B2
(45) Date of Patent: May 17, 2022

(54) METHOD AND SYSTEM FOR RECOMMENDING TEAMMATE FOR TEAM GAME

(71) Applicant: Acer Incorporated, New Taipei (TW)

(72) Inventors: Pin-Cyuan Lin, New Taipei (TW);
Sheng-Wei Chu, New Taipei (TW);
Chun-Hsien Li, New Taipei (TW);
Jun-Hong Chen, New Taipei (TW);
Te-Chung Huang, New Taipei (TW);
Tsung-Hsien Tsai, New Taipei (TW);
Yueh-Yarng Tsai, New Taipei (TW)

(73) Assignee: Acer Incorporated, New Taipei (TW)

( * ) Notice: Subject to any disclaimer, the term of this patent is extended or adjusted under 35 U.S.C. 154(b) by 0 days.

(21) Appl. No.: 17/093,645

(22) Filed: Nov. 10, 2020

(65) Prior Publication Data

US 2022/0072431 A1     Mar. 10, 2022

(30) Foreign Application Priority Data

Sep. 10, 2020   (TW) ................ 109131099

(51) Int. Cl.
*A63F 13/795* (2014.01)
*A63F 13/822* (2014.01)
*A63F 13/798* (2014.01)

(52) U.S. Cl.
CPC .......... *A63F 13/795* (2014.09); *A63F 13/798* (2014.09); *A63F 13/822* (2014.09); *A63F 2300/5566* (2013.01)

(58) Field of Classification Search
CPC .................................................. A63F 13/795
See application file for complete search history.

(56) References Cited

U.S. PATENT DOCUMENTS

| | | | |
|---|---|---|---|
| 9,623,322 B1 * | 4/2017 | Wakeford | ............... A63F 13/23 |
| 2012/0142429 A1 | 6/2012 | Muller | |

(Continued)

FOREIGN PATENT DOCUMENTS

| CN | 104899321 | 9/2015 |
|---|---|---|
| CN | 106919790 | 7/2017 |

(Continued)

OTHER PUBLICATIONS

"Search Report of Europe Counterpart Application", dated Mar. 26, 2021, p. 1-p. 7.

*Primary Examiner* — Jay Trent Liddle
(74) *Attorney, Agent, or Firm* — JCIPRNET

(57) ABSTRACT

A method and a system for recommending a teammate for a team game are provided. The method includes the following: searching game data, where the game data includes a plurality of game evaluation parameters; choosing a target parameter from the game evaluation parameters, where a correlation between the target parameter and at least one game experience index is greater than a correlation between remaining parameters and the at least one game experience index; automatically selecting a target role position according to the target parameter and a first game role position of a chosen game role; automatically selecting a target game role according to the target role position; and recommending a player to be teamed up who plans to use the target game role to play the game as a teammate according to the target game role.

10 Claims, 6 Drawing Sheets

(56) References Cited

U.S. PATENT DOCUMENTS

| | | | |
|---|---|---|---|
| 2014/0011595 A1* | 1/2014 | Muller | A63F 13/35 |
| | | | 463/42 |
| 2015/0038233 A1* | 2/2015 | Rom | A63F 13/795 |
| | | | 463/42 |
| 2016/0001181 A1 | 1/2016 | Marr et al. | |
| 2017/0259178 A1 | 9/2017 | Aghdaie et al. | |
| 2020/0269139 A1* | 8/2020 | Aghdaie | A63F 13/73 |
| 2020/0289943 A1* | 9/2020 | Rico | G06K 9/6256 |

FOREIGN PATENT DOCUMENTS

| | | |
|---|---|---|
| CN | 110193202 | 9/2019 |
| TW | 553755 | 9/2003 |
| TW | 557225 | 10/2003 |
| TW | 201012526 | 4/2010 |
| TW | 201019998 | 6/2010 |
| TW | I389722 | 3/2013 |
| TW | 202001540 | 1/2020 |
| TW | 202030008 | 8/2020 |

* cited by examiner

| | if win | kills | deaths | assists | ••• | kda |
|---|---|---|---|---|---|---|
| if win | 1 | 0.279 | −0.398 | 0.359 | ••• | 0.485 |

| role position / role position | ADC | JUNGLER | MIDDLE | SUPPORT | TOP |
|---|---|---|---|---|---|
| ADC | 1 | 0.3401 | 0.2950 | 0.4659 | 0.2557 |
| JUNGLER | 0.3401 | 1 | 0.3701 | 0.3503 | 0.3135 |
| MIDDLE | 0.2950 | 0.3701 | 1 | 0.2630 | 0.2541 |
| SUPPORT | 0.4659 | 0.3503 | 0.2630 | 1 | 0.2333 |
| TOP | 0.2557 | 0.3135 | 0.2541 | 0.2333 | 1 |

FIG. 5

| | | role A (ADC) | role B (MIDDLE) | (weighted average) |
|---|---|---|---|---|
| SUPPORT | role C | 58.2% | 53.2% | ⇨ 56.4% |
| | role D | 55.6% | 51.6% | ⇨ 54.2% |
| | role E | 55.3% | 50.2% | ⇨ 53.5% |
| | ⋮ | ⋮ | ⋮ | |

FIG. 6

| candidate player | winning percentage |
|---|---|
| player 1002 | 67.2% | ⇐ chosen
| player 6805 | 62.8% |
| player 3251 | 53.5% |
| ⋮ | ⋮ |

METHOD AND SYSTEM FOR RECOMMENDING TEAMMATE FOR TEAM GAME

CROSS-REFERENCE TO RELATED APPLICATION

This application claims the priority benefit of Taiwan application serial no. 109131099, filed on Sep. 10, 2020. The entirety of the above-mentioned patent application is hereby incorporated by reference herein and made a part of this specification.

BACKGROUND

Technical Field

The disclosure relates to a computer technology, and in particular, to a method and a system for recommending a teammate for a team game.

Description of Related Art

With the development of the online game industry, online team games of the multiplayer online battle arena (MOBA) type have become the mainstream game type among various online games. Related games include, for example, Dota2, League of Legends (LOL), Arena of Valor, and the like. Generally, before playing a team game of this type, a player has to choose a game role that he/she would like to use. Next, after computer matching, a game team formed by multiple players (usually 5 people performing individual duties) of the player's side has to defeat a game team formed by multiple enemy players, such as breaking the enemy's defensive positions, to win the game. Nevertheless, in a conventional online game interface, before a game starts, a teammate is randomly recommended, or a player joins a game team at random. In this way, game quality is affected most of the time owing to poor choice of teammates during the game.

SUMMARY

The disclosure provides a method and a system for recommending a teammate for a team game through which a suitable teammate may be automatically selected to form a team with a player, and game quality is thereby improved.

The disclosure provides a method for recommending a teammate for a team game, and the method includes the following steps. Game data is searched, where the game data includes a plurality of game evaluation parameters. A target parameter is chosen from the game evaluation parameters, where a correlation between the target parameter and at least one game experience index is greater than a correlation between remaining parameters among the game evaluation parameters and the at least one game experience index. A target role position is automatically selected from a plurality of candidate game role positions according to the target parameter and a first game role position of at least one chosen game role. A target game role is automatically selected among a plurality of candidate game roles according to the target role position, such that a predicted winning percentage of a game played by the target game role matched with the at least one chosen game role is greater than a predicted winning percentage of the game played by remaining game roles among the candidate game roles matched with the at least one chosen game role. A player to be teamed up who plans to use the target game role to play the game is recommended as a teammate according to the target game role.

The embodiments of the disclosure further provide a system for recommending a teammate for a team game, and the system includes a server host and a user computer. The user computer is connected to the server host. When the user computer executes a game, the server host searches game data. The game data includes a plurality of game evaluation parameters. The server host chooses a target parameter from the game evaluation parameters. A correlation between the target parameter and at least one game experience index is greater than a correlation between remaining parameters among the game evaluation parameters and the at least one game experience index. The server host automatically selects a target role position from a plurality of candidate game role positions according to the target parameter and a first game role position of at least one selected game role. The server host automatically selects a target game role among a plurality of candidate game roles according to the target role position, such that a predicted winning percentage of a game played by the target game role matched with the at least one chosen game role is greater than a predicted winning percentage of the game played by remaining game roles among the candidate game roles matched with the at least one chosen game role. The server host recommends a player to be teamed up who plans to use the target game role to play the game as a teammate according to the target game role.

To sum up, according to the game data, the target parameter which has a high correlation with the game experience index may be automatically chosen. Next, the target role position may be automatically selected according to the target parameter and the first game role position of the at least one chosen game role. Next, the target game role may be automatically selected according to the target role position to obtain a role team-matching combination exhibiting a high predicted winning percentage. A player to be teamed up who plans to use the target game role to play the game is then recommended as a teammate according to the target game role, and game quality is therefore improved.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

FIG. 5 is a schematic graph illustrating table data according to an embodiment of the disclosure.

FIG. 6 is a schematic graph illustrating table data according to an embodiment of the disclosure.

FIG. 7 is a schematic graph illustrating table data according to an embodiment of the disclosure.

DESCRIPTION OF THE EMBODIMENTS

Figure 1:
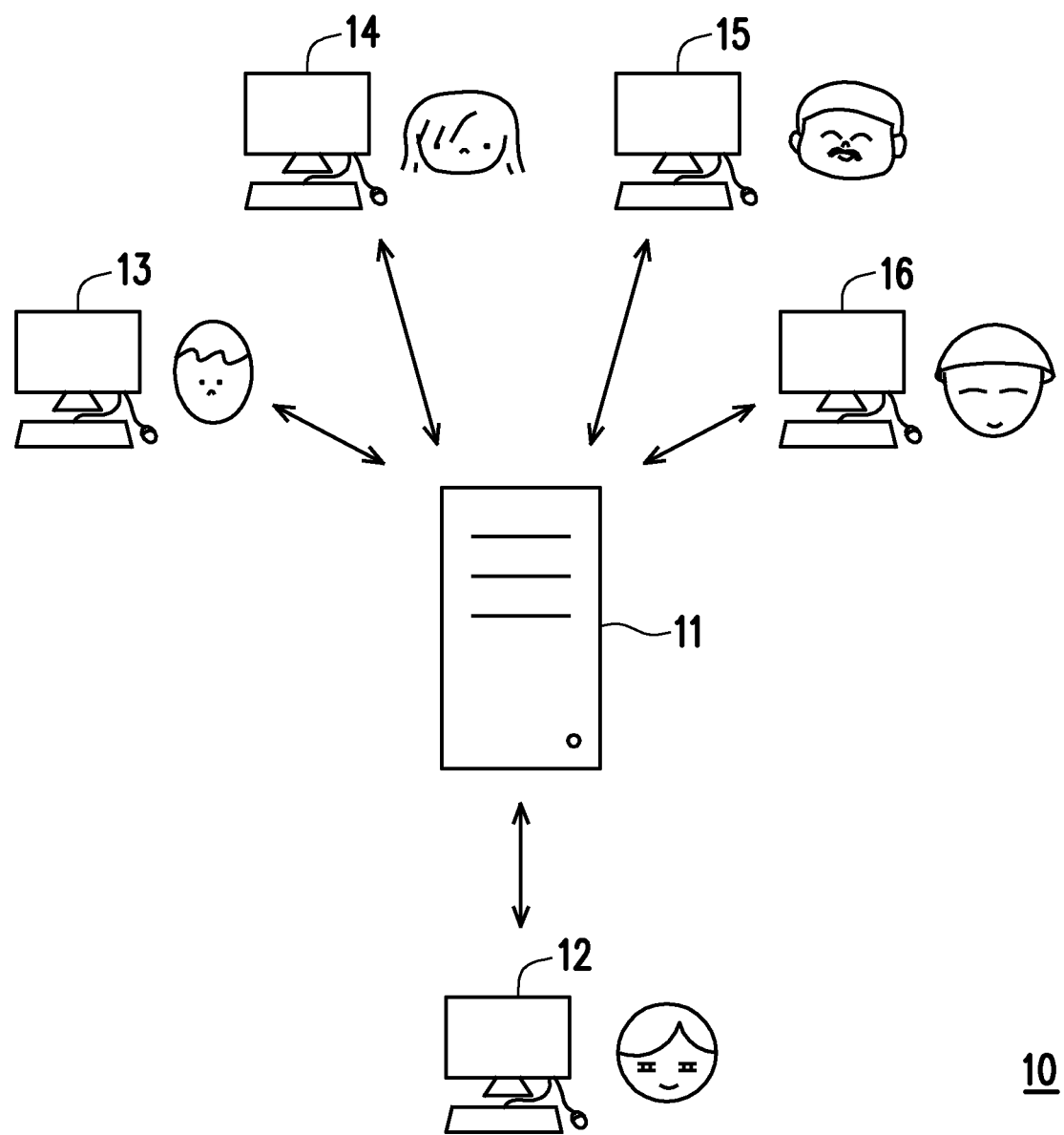
FIG. 1 is a schematic view illustrating a system for recommending a teammate for a team game according to an embodiment of the disclosure.

FIG. 1 is a schematic view illustrating a system for recommending a teammate for a team game according to an embodiment of the disclosure. With reference to FIG. 1, a system 10 for recommending a teammate for a team game includes a server host 11 and user computers 12 to 16. The user computers 12 to 16 may be connected to the server host 11 through wired or wireless Internet connection to play a game (also called as a team game). For instance, the game may be a team game of a multiplayer online battle arena (MOBA) type such as Dota2, League of Legends (LOL), and Arena of Valor. Note that the total number of the user computers 12 to 16 and the total number of the server host 11 may both be adjusted according to practices, which is not particularly limited by the disclosure.

In an embodiment, the server host 11 may provide an online multiplayer gaming platform. The user computers 12 to 16 may be used to simultaneously play a game on this gaming platform and may be used to execute recording and exchanging of game data. On the gaming platform, a user of each user computer may choose a game role that is good at or dedicated to a specific game role position to play the game. Taking the LOL as an example, one team includes 5 game role positions, namely ADC, Jungle, Middle, Support, and Top. It is assumed that the game role position that a player is good at is Middle, so this player may choose the game role that is good at or dedicated to Middle to join a game team. After each of the 5 users of our side and an opposing side chooses their respective game roles that they are good at, the game may start after confirmation made by both sides. Note that different team games may have different game rules, so that the number of players in one game team and configurations of the game role positions may also be different in practices, which is not particularly limited by the disclosure.

Figure 2:
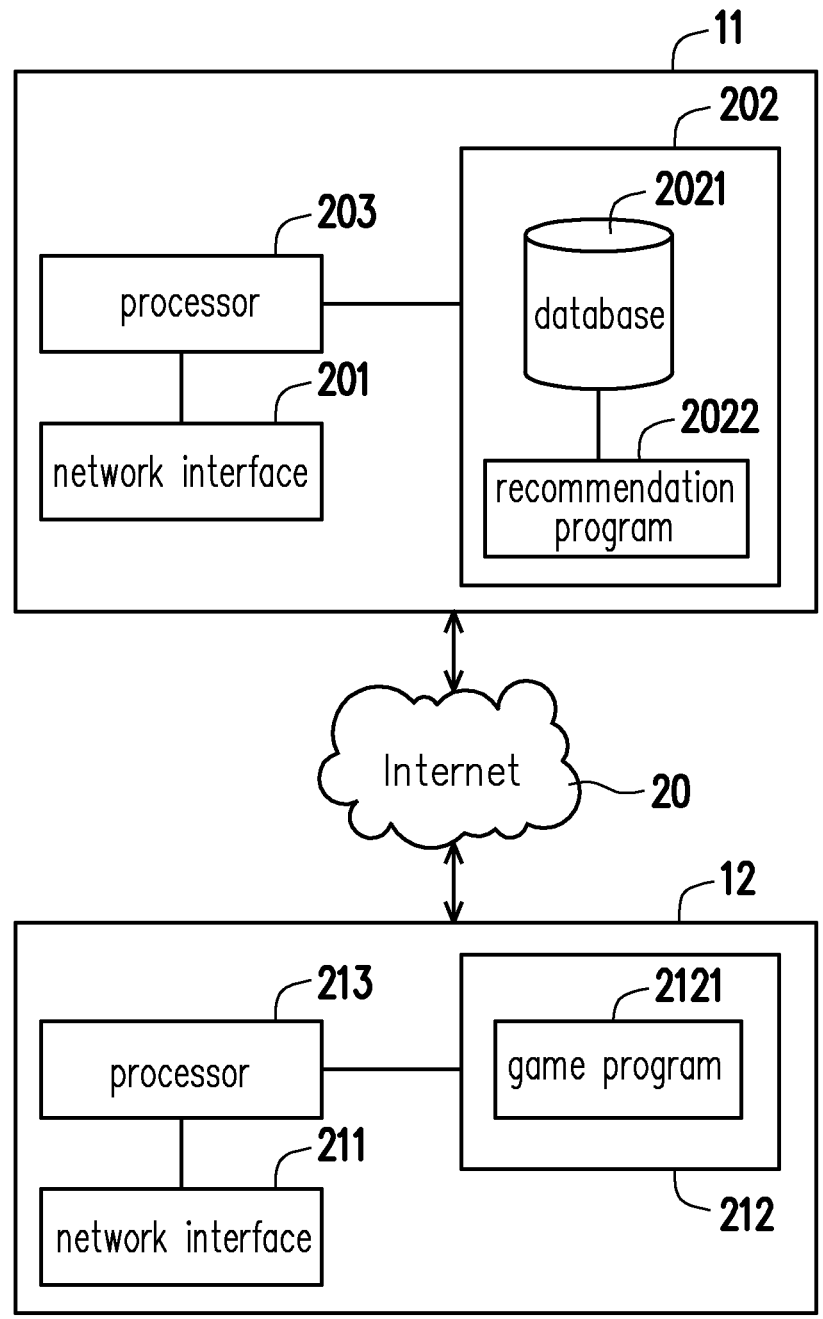
FIG. 2 is a block diagram illustrating functions of a server host and a user computer according to an embodiment of the disclosure.

FIG. 2 is a block diagram illustrating functions of a server host and a user computer according to an embodiment of the disclosure. With reference to FIG. 2, the server host 11 and the user computer 12 are taken as an example herein. The server host 11 may include one or a plurality of computer hosts. The user computer 12 may be a computer apparatus that may be used to play games including a smartphone, a tablet computer, a desktop computer, a notebook computer, or a game console, and the types are not limited thereto. In addition, the server host 11 and the user computer 12 may communicate with each other through Internet 20.

The server host 11 may include a network interface 201, a storage circuit 202, and a processor 203. The network interface 201 may include a wired and/or wireless network interface card(s). For instance, the network interface 201 may include an Ethernet interface card and/or a WIFI wireless network interface card and the like. The server host 11 may be connected to the Internet 20 through the network interface 201. The storage circuit 202 may include a non-volatile storage circuit such as a conventional hard disk drive (HDD), a solid state drive (HDD), or a hybrid drive including the foregoing two. The processor 203 is coupled to the network interface 201 and the storage circuit 202. The processor 203 is responsible for the overall or partial operation of the server host 11. For instance, the processor 203 may include a central processing unit (CPU), a graphic processing unit (GPU), or a programmable microprocessor for general or special use, a digital signal processor (DSP), a programmable controller, an application specific integrated circuit (ASIC), a programmable logic device (PLD), other similar devices, or a combination of the foregoing devices. Besides, the server host 11 may further include basic electronic members of other types such as an input/output (IO) device and a power supply device, which is not particularly limited by the disclosure.

The user computer 12 may include a network interface 211, a storage circuit 212, and a processor 213. The network interface 211 may include a wired and/or wireless network interface card(s). For instance, the network interface 211 may include an Ethernet interface card and/or a WIFI wireless network interface card and the like. The user computer 12 may be connected to the Internet 20 through the network interface 211. The storage circuit 212 may include a non-volatile storage circuit such as a conventional hard disk drive (HDD), a solid state drive (HDD), or a hybrid drive including the foregoing two. The processor 213 is coupled to the network interface 211 and the storage circuit 212. The processor 213 is responsible for the overall or partial operation of the user computer 12. For instance, the processor 213 may include a central processing unit (CPU), a graphic processing unit (GPU), or a programmable microprocessor for general or special use, a digital signal processor (DSP), a programmable controller, an application specific integrated circuit (ASIC), a programmable logic device (PLD), other similar devices, or a combination of the foregoing devices. Besides, the user computer 12 may further include basic electronic members of other types such as an input/output (IO) device and a power supply device, which is not particularly limited by the disclosure. Note that the user computer 12 shown in FIG. 2 may be identical or similar to the rest of the user computers 13 to 16 shown in FIG. 1, and description thereof is thus not repeated herein.

The storage circuit 202 of the server host 11 stores a database 2021 and a recommendation program 2022. The database 2021 is configured to store game history data. The game history data may include data of a previous game played on a gaming platform, account data of a register player, etc. provided by the server host 11. In addition, the database 2021 is further configured to store statistical data obtained after statistical analysis performed on game data of a specific type in the background. For instance, the statistical data may include a resource score obtained by a specific player in one or a plural games, the number of kills obtained by a specific player in one or plural games, the number of deaths obtained by a specific user in one or plural games, and/or the number of assists obtained by a specific player in one or plural games and so on, and a type of the statistical data is not limited thereto. In the following embodiments, the statistical data includes a plurality of game statistical parameters. Each of the game statistical parameters reflects statistical data of a specific type. Besides, before a game starts, the processor 203 may run the recommendation program 2022 to recommend a suitable teammate to a player who has chosen a team and a game role to form the team.

Further, the storage circuit 212 of the user computer 12 stores a game program 2121. The processor 213 may run the game program 2121 to be connected to the server host 11 for game playing. For instance, the game program 2121 may provide a user-side game interface on the user computer 12. A user of the user computer 12 may operate the game interface to choose a team, a game role, etc.

Figures 3, 4:
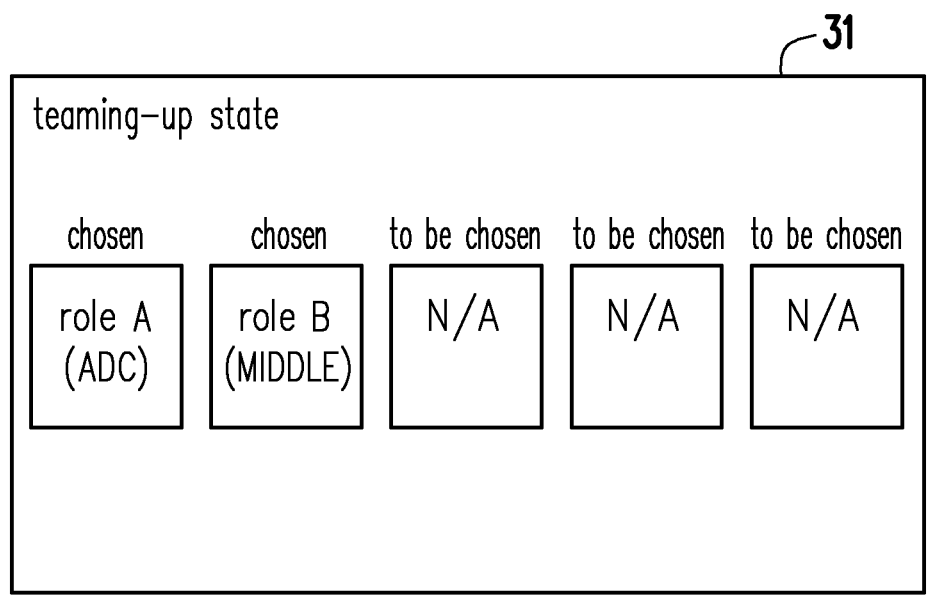
FIG. 3 is a schematic view illustrating a game interface according to an embodiment of the disclosure.
FIG. 4 is a schematic graph illustrating table data according to an embodiment of the disclosure.

FIG. 3 is a schematic view illustrating a game interface according to an embodiment of the disclosure. With reference to FIG. 1 to FIG. 3, after the game program 2121 is run, a game interface 31 may be presented to a screen of the user computer 12. The game interface 31 may present a teaming-up state of a game team. It is assumed that the current teaming-up state shows that users of the user computers 12 and 13 respectively choose a role A and a role B to join the same game team. A game role position of the role A is ADC, and a game role position of the role B is MIDDLE. In this team of 5 players, 3 more players are required to complete forming of this team. In an embodiment, the processor 203 of the server host 11 may run the recommendation program 2022 to recommend a suitable teammate to join this game team.

In an embodiment, the processor 203 may search a plurality of game evaluation parameters in the database 2021. The processor 203 may choose one of the game evaluation parameters as a target parameter from the game evaluation parameters. For instance, the game evaluation parameters include the foregoing one or plural game statistical parameters. In particular, a correlation between the target parameter and at least one game experience index is greater than a correlation between remaining parameters which are not chosen among the game evaluation parameters and the at least one game experience index. For instance, the game experience index may include an evaluation index related to a player game experience including winning and losing of the game, the resource score obtained in the game, and/or a teammate reward score obtained in the game, and a type of the game experience index is not limited thereto. In the following embodiment, the winning and losing of the game is taken as an example of the game experience index for description.

FIG. 4 is a schematic graph illustrating table data according to an embodiment of the disclosure. With reference to FIG. 4, table data 41 records correlation values between a plurality of game statistical parameters and winning and losing of at least one previous game. For instance, the game statistical parameters include the numbers of kills, deaths, assists, and kda ((kills+assists)/deaths). These game statistical parameters may all be obtained through statistical calculation performed on recorded game history data of a specific game played by at least some of the players. In addition, the table data 41 may further record more types of the game statistical parameters, which are not particularly limited by the disclosure.

The table data 41 is taken as an example herein, in at least one previous winning game, correlations between the parameters of kills, deaths, assists, and kda and winning of the game respectively are 0.279, −0.398, 0.359, and 0.485. Herein, the correlation value between the parameter kda and winning of the game is the greatest (0.485), meaning that the correlation between the value of the calculated parameter kda and winning of at least one previous game is the highest. That is, in previous games, if a specific player or a game role has a large number of kills, a large number of assists, and/or a small number of deaths (so that the value of the parameter kda is high), probability of wining of the team that this player or game role belongs eventually is high. In contrast, the correlation value between the parameter deaths and winning of the game is the smallest (−0.398), meaning that the correlation between the value of the calculated parameter deaths and winning of at least one previous game is the lowest. That is, if a specific player or a game role has a large number of deaths (so that the value of the parameter deaths is high), probability of wining of the team that this player or game role belongs eventually is low. In an embodiment, according to the table data 41, the processor 203 may choose the parameter kda to act as the target parameter.

In an embodiment, the table data 41 may also record correlation values between a plurality of types of the game statistical parameters and other types of the game experience indexes (e.g., the resource score obtained in the game or the teammate reward score obtained in the game). The resource score obtained in the game and the parameter kda are taken as an example herein, it is assumed that a correlation value between the parameter kda and the resource score obtained in the game is the greatest (0.485), meaning that the correlation between the value of the calculated parameter kda and resource value obtained in least one previous game is the highest, and the rest may be deduced by analogy. Therefore, the processor 203 may choose the parameter kda to act as the target parameter.

In an embodiment, the processor 203 may automatically select a target role position from a plurality of candidate game role positions according to the target parameter and a game role position (also known as a first game role position) of at least one chosen game role. Compared to other game role positions that are not chosen, a correlation between the target role position and the first game role position in terms of the target parameter is the highest.

In an embodiment, it is assumed that the candidate game role positions include a first candidate game role position and a second candidate game role position. The processor 203 may obtain a correlation value (also known as a first correlation value) between the first candidate game role position and the first game role position in terms of the target parameter. For instance, the first correlation value may reflect a correlation between the target parameter calculated when the first candidate game role position is used to play the game and the target parameter calculated when the first game role position is used to play the game. Further, the processor 203 may obtain a correlation value (also known as a second correlation value) between the second candidate game role position and the first game role position in terms of the target parameter. For instance, the second correlation value may reflect a correlation between the target parameter calculated when the second candidate game role position is used to play the game and the target parameter calculated when the first game role position is used to play the game. The processor 203 may choose one of the first candidate game role position and the second candidate game role position (e.g., the first candidate game role position) to act as the target role position according to the first correlation value and the second correlation value. For instance, the processor 203 may compare the first correlation value with the second correlation value and chooses the first candidate game role position corresponding to the first correlation value having a larger value as the target role position.

FIG. 5 is a schematic graph illustrating table data according to an embodiment of the disclosure. With reference to FIG. 5, table data 51 records a plurality of correlation values among a plurality of game role positions in terms of the target parameter. These values may all be obtained through statistical calculation performed on recorded game history data of a specific game played by at least some of the players. In addition, the table data 51 may further record other types of the game statistical parameters, which are not particularly limited by the disclosure.

According to the table data 51, a correlation value between the calculated target parameter (e.g., the parameter kda) for the game role position ADC and the calculated target parameter for the game role position Jungle is 0.3401.

A correlation value between the calculated target parameter for the game role position ADC and the calculated target parameter for the game role position Middle is 0.2950. A correlation value between the calculated target parameter for the game role position ADC and the calculated target parameter for the game role position Support is 0.4659. Further, a correlation value between the calculated target parameter for the game role position ADC and the calculated target parameter for the game role position Top is 0.2557. The rest may be deduced by analogy, and in this way, the correlation values among the rest of the game role positions in terms of the target parameter in the table data 51 may be obtained.

In an embodiment, it is assumed that the first game role position includes ADC (that is, the game role position of the chosen role A in FIG. 3) and Middle (that is, the game role position of the chosen role B in FIG. 3). After searching the table data 51, the processor 203 may choose the candidate game role position Support as the target role position according to the greatest one (e.g., 0.4659) among the correlation values between the first game role position (i.e., ADC and/or Middle) and the plural candidate game role positions (i.e., ADC, Jungle, Middle, Support, and Top) in terms of the target parameter. Note that the correlation value between the same candidate game role positions in terms of the target parameter is 1, and this situation may not be considered.

In an embodiment, the game evaluation parameters may also include an expert grading parameter. The expert grading parameter includes correlation values among different game role positions configured by an expert (e.g., a senior player and/or a game designer). In an embodiment, the processor 203 may choose the expert grading parameter as the target parameter. The processor 203 may automatically select the target role position from the plural candidate game role positions according to the expert grading parameter (i.e., the target parameter) and the game role position (i.e., the first game role position) of the at least one chosen game role.

In an embodiment of FIG. 5, it is assumed that the table data 51 is configured to record the expert grading parameter. For instance, in the table data 51, the value corresponding to the game role positions ADC and Jungle (e.g., 0.3401) may reflect the correlation value between the game role positions ADC and Jungle, the value corresponding to the game role positions Middle and Support (e.g., 0.2630) may reflect the correlation value between the game role positions Middle and Support, and the rest may be deduced by analogy. In this embodiment, the processor 203 may choose the candidate game role position Support as the target role position according to the greatest one (e.g., 0.4659) among the correlation values between the first game role position (i.e., ADC and/or Middle) and the plural candidate game role positions (i.e., ADC, Jungle, Middle, Support, and Top) in terms of the target parameter. Note that the values recorded in the table data 51 may be configured according to actual practices, which are not particularly limited by the disclosure.

In an embodiment, the processor 203 may automatically select the target game role among the candidate game roles according to the chosen target role position. As such, a predicted winning percentage of a game played by the target game role matched with the chosen game role is greater than a predicted winning percentage of the game played by remaining game roles among the candidate game roles matched with the chosen game role. Note that the candidate game roles refer to game roles suitable for or dedicated to the target role position based on a system configuration.

In an embodiment, the processor 203 may obtain weight information according to the first correlation value. The processor 203 may obtain a winning percentage evaluation value (also known as a first winning percentage evaluation value) according to historical winning percentage information (also known as first historical winning percentage information) of the game played by a specific candidate game role (also known as a first candidate game role) among the candidate game roles matched with the chosen game role and the weight information. Further, the processor 203 may obtain another winning percentage evaluation value (also known as a second winning percentage evaluation value) according to historical winning percentage information (also known as second historical winning percentage information) of the game played by another candidate game role (also known as a second candidate game role) among the candidate game roles matched with the chosen game role and the weight information. The processor 203 may choose the first candidate game role corresponding to the first winning percentage evaluation value having a larger value as the target game role according to the first winning percentage evaluation and the second winning percentage evaluation value.

FIG. 6 is a schematic graph illustrating table data according to an embodiment of the disclosure. With reference to FIG. 2 and FIG. 6, it is assumed that the chosen target role position is Support, and the game roles suitable to act as Support include a role C to a role E, etc. According to the chosen role A and the role B in FIG. 3, the processor 203 may search the database 2021 to obtain winning percentages of a game played by the role A and the role B matched with the role C to the role E in at least one previous game. The processor 203 may record such winning percentage information in table data 61.

According to the table data 61, in at least one previous game, historical winning percentages of the role A acting as ADC matched with the roles C to E acting as Support respectively are 58.2%, 55.6%, and 55.3%, and Historical winning percentages of the role B acting as Middle matched with the roles C to E acting as Support respectively are 58.2%, 55.6%, and 50.2%. The processor 203 may further obtain winning percentage evaluation values of the roles A+B matched with the roles C to E according to the table data 61. For instance, the processor 203 may obtain the winning percentage evaluation value of 56.4% according to the respective historical winning percentages of 58.2% and 53.2% of the roles A and B matched with the role C. This winning percentage evaluation value may be a weighted average of 58.2% and 53.2%. This winning percentage evaluation value may also be a predicted winning percentage of the roles A and B matched with the role C.

In an embodiment, the processor 203 may treat the correlation values of 0.4659 and 0.2630 as the weight information according to the table data 51 of FIG. 5. Herein, the correlation value of 0.4659 reflects the correlation between the calculated target parameter (e.g., kda) for the game role position ADC and the calculated target parameter for the game role position Support, and the correlation value of 0.2630 reflects the correlation between the calculated target parameter for the game role position Middle and the calculated target parameter for the game role position Support. The processor 203 may obtain the winning percentage evaluation value of 56.4% according to such weight information and the respective historical winning percentages of 58.2% and 53.2% of the roles A and B matched with the role C. For instance, 56.4%=(58.2%×0.4659+53.2%×0.2630/(0.4659+0.2630). Through analogy, the processor 203 may obtain the winning percentage evaluation value of 54.2% according to such weight information and the respective historical winning percentages of 55.6% and 51.6% of the roles A and B matched with the role D. For instance, 54.2%=(55.6%×0.4659+51.6%×0.2630/(0.4659+0.2630).

This winning percentage evaluation value may be a weighted average of 55.6% and 51.6%. In addition, the processor 203 may obtain the winning percentage evaluation value of 53.5% according to such weight information and the respective historical winning percentages of 55.3% and 50.2% of the roles A and B matched with the role E. For instance, 53.5%=(55.3%×0.4659+50.2%×0.2630/(0.4659+0.2630). This winning percentage evaluation value may be a weighted average of 53.5% and 50.2%. In an embodiment, the processor 203 may choose the role C which corresponds to a maximum winning percentage evaluation value (e.g., 56.4%) as the target game role.

In an embodiment, the processor 203 may recommend a player to be teamed up who plans to use such target game role to play the game as a teammate according to the target game role. For instance, after determining that the role C whose game role position is Support is the target game role, the processor 203 may obtain a player list. This player list may record identification information of at least one candidate player planning to play the game by using the role C whose game role position is Support. The processor 203 may automatically choose one of the at least one candidate player to be treated as a recommended player to be teamed up. In an embodiment, the processor 203 may choose one from the at least one candidate player as the recommended player to be teamed up according to winning percentage information of the candidate player using the target game role to play the game in the past.

FIG. 7 is a schematic graph illustrating table data according to an embodiment of the disclosure. With reference to FIG. 2 and FIG. 7, table data 71 presents winning percentages of plural candidate players using the role C whose game role position is Support to play the game in the past. For instance, the winning percentages corresponding to the players with numbers 1002, 6805, and 3251 respectively are 67.2%, 62.8%, and 53.5%. The processor 203 may choose the player with the number 1002 having the highest winning percentage (e.g., 67.2%) as the recommended player to be teamed up. For instance, the recommended player and the role C used by the player may be presented in the game interface 31 in FIG. 3. In another embodiment, the winning percentages shown in the table data 71 may also be used to indicate career cumulative winning percentages of players or winning percentage information under other conditions, which is not particularly limited by the disclosure.

Note that the table data 41 to 71 shown in FIG. 4 to FIG. 7 are all examples. In other embodiments, the table data may also be used to record more useful data or to record data through other forms, which is not particularly limited by the disclosure. In addition, the data provided in the previous embodiments may all be dynamically updated and recorded in the database 2021 in FIG. 2 as the player continues to play the game. Thereafter, the data in the database 2021 may thus be dynamically configured to determine the teammate to be recommended to the player according to the description provided in the foregoing embodiments, such that game quality of the team game may be effectively improved.

Figure 8:
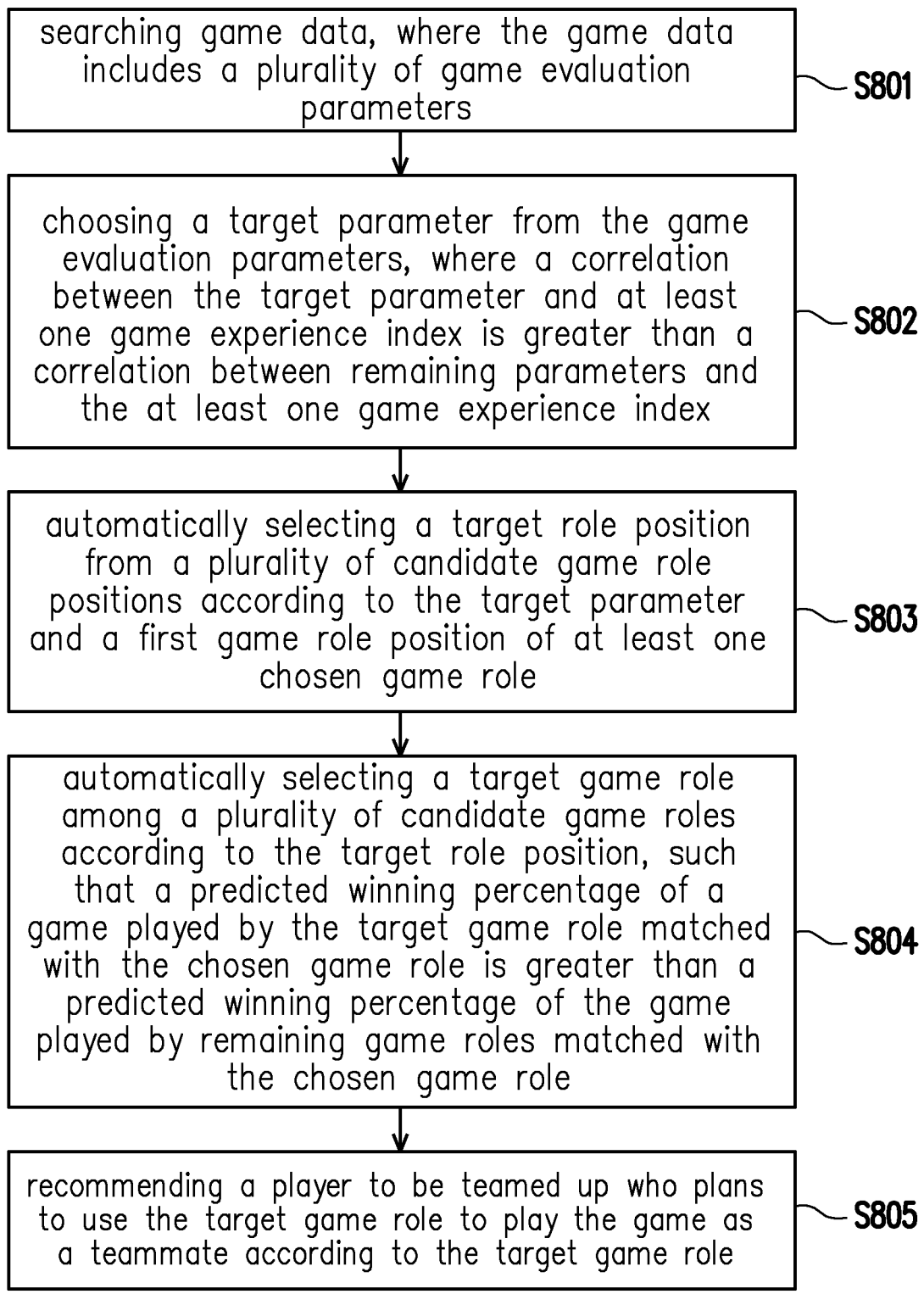
FIG. 8 is a flow chart illustrating a method for recommending a teammate for a team game according to an embodiment of the disclosure.

FIG. 8 is a flow chart illustrating a method for recommending a teammate for a team game according to an embodiment of the disclosure. With reference to FIG. 8, in step S801, game data is searched, and the game data includes a plurality of game evaluation parameters. In step S802, a target parameter is chosen from the game evaluation parameters. A correlation between the target parameter and at least one game experience index is greater than a correlation between remaining parameters among the game evaluation parameters and the at least one game experience index. In step S803, a target role position is automatically selected from a plurality of candidate game role positions according to the target parameter and a first game role position of at least one chosen game role. In step S804, a target game role is automatically selected among a plurality of candidate game roles according to the target role position. In this way, a predicted winning percentage of a game played by the target game role matched with the at least one chosen game role is greater than a predicted winning percentage of the game played by remaining game roles among the candidate game roles matched with the at least one chosen game role. In step S805, a player to be teamed up who plans to use the target game role to play the game is recommended as a teammate according to the target game role.

Each step of FIG. 8 has been specified as above and thus is not repeated hereinafter. It should be noted that each step of FIG. 8 may be implemented as a plurality of program codes or circuits, which is not particularly limited by the disclosure. In addition, the method of FIG. 8 may be used in combination with the above-described exemplary embodiments or be used solely, which is not particularly limited by the disclosure.

In view of the foregoing, according to the game data, the target parameter which has a high correlation with a specific game experience index may be automatically chosen. Next, the target role position may be automatically selected according to the target parameter and the first game role position of the at least one chosen game role. Next, the target game role may be automatically selected according to the target role position to obtain a role team-matching combination exhibiting a high predicted winning percentage. A player to be teamed up who plans to use the target game role to play the game is then recommended as a teammate according to the target game role, and game quality of the team game is therefore improved.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:
1. A method for recommending a teammate for a team game, comprising:
    searching game data, wherein the game data comprises a plurality of game evaluation parameters;
    choosing a target parameter from the game evaluation parameters based on a correlation between each of the game evaluation parameters and at least one game experience index, such that a correlation between the target parameter and the at least one game experience index is greater than a correlation between each of remaining parameters among the game evaluation parameters and the at least one game experience index, and the at least one game experience index includes at least one of winning of a game and game score obtained by playing the game;
    automatically selecting a target role position from a plurality of candidate game role positions according to the target parameter corresponding to the target role position and a first game role position of at least one chosen game role, wherein the candidate game role positions are default game role positions in the game;

obtaining a predicted winning rate of a game played by using each of a plurality of candidate game roles corresponding to the target role position with the at least one chosen game role;

automatically selecting a target game role among the candidate game roles based on the predicted winning rate, such that a predicted winning rate of a game played by using the target game role with the at least one chosen game role is greater than a predicted winning rate of a game played by using each of remaining game roles among the candidate game roles with the at least one chosen game role; and recommending a player to be teamed up who plans to use the target game role to play the game as a teammate according to the target game role.

2. The method for recommending the teammate for the team game according to claim 1, wherein the step of automatically selecting the target role position from the candidate game role positions according to the target parameter corresponding to the target role position and the first game role position of the at least one chosen game role comprises:

obtaining a first correlation value between a first candidate game role position among the candidate game role positions and the first game role position in terms of the target parameter;

obtaining a second correlation value between a second candidate game role position among the candidate game role positions and the first game role position in terms of the target parameter; and choosing the first candidate game role position as the target role position according to the first correlation value and the second correlation value.

3. The method for recommending the teammate for the team game according to claim 2, wherein the first correlation value reflects a correlation between the target parameter calculated when the first candidate game role position is used to play the game and the target parameter calculated when the first game role position is used to play the game, and the second correlation value reflects a correlation between the target parameter calculated when the second candidate game role position is used to play the game and the target parameter calculated when the first game role position is used to play the game.

4. The method for recommending the teammate for the team game according to claim 2, wherein the step of automatically selecting the target game role among the candidate game roles based on the predicted winning rate comprises:

obtaining weight information according to the first correlation value;

obtaining a first winning percentage evaluation value according to first historical winning percentage information of the game played by a first candidate game role among the candidate game roles matched with the at least one chosen game role and the weight information;

obtaining a second winning percentage evaluation value according to second historical winning percentage information of the game played by a second candidate game role among the candidate game roles matched with the at least one chosen game role and the weight information; and choosing the first candidate game role as the target game role according to the first winning percentage evaluation value and the second winning percentage evaluation value.

5. The method for recommending the teammate for the team game according to claim 4, wherein the step of recommending the player to be teamed up who plans to use the target game role to play the game as the teammate according to the target game role comprises:

obtaining a player list, wherein the player list records identification information of at least one candidate player planning to play the game by using the target game role; and choosing one from the at least one candidate player as the recommended player to be teamed up according to winning percentage information of the at least one candidate player using the target game role to play the game in the past.

6. A system for recommending a teammate for a team game, comprising:

a server host; and a user computer, connected to the server host, wherein when the user computer executes a game, the server host searches game data, and the game data comprises a plurality of game evaluation parameters, wherein the server host chooses a target parameter from the game evaluation parameters based on a correlation between each of the game evaluation parameters and at least one game experience index, such that a correlation between the target parameter and the at least one game experience index is greater than a correlation between each of remaining parameters among the game evaluation parameters and the at least one game experience index, and the at least one game experience index includes at least one of winning of a game and game score obtained by playing the game, wherein the server host automatically selects a target role position from a plurality of candidate game role positions according to the target parameter corresponding to the target role position and a first game role position of at least one selected game role, wherein the candidate game role positions are default game role positions in the game, wherein the server host obtains a predicted winning rate of a game played by using each of a plurality of candidate game roles corresponding to the target role position with the at least one chosen game role;

wherein the server host automatically selects a target game role among the candidate game roles based on the predicted winning rate, such that a predicted winning rate of a game played by using the target game role with the at least one chosen game role is greater than a predicted winning rate of a game played by using each of remaining game roles among the candidate game roles with the at least one chosen game role, wherein the server host recommends a player to be teamed up who plans to use the target game role to play the game as a teammate according to the target game role.

7. The system for recommending the teammate for the team game according to claim 6, wherein the operation of automatically selecting the target role position from the candidate game role positions according to the target parameter corresponding to the target role position and the first game role position of the at least one chosen game role comprises:

obtaining a first correlation value between a first candidate game role position among the candidate game role positions and the first game role position in terms of the target parameter;

obtaining a second correlation value between a second candidate game role position among the candidate game role positions and the first game role position in terms of the target parameter; and choosing the first candidate game role position as the target role position according to the first correlation value and the second correlation value.

8. The system for recommending the teammate for the team game according to claim 7, wherein the first correlation value reflects a correlation between the target parameter calculated when the first candidate game role position is used to play the game and the target parameter calculated when the first game role position is used to play the game, and the second correlation value reflects a correlation between the target parameter calculated when the second candidate game role position is used to play the game and the target parameter calculated when the first game role position is used to play the game.

9. The system for recommending the teammate for the team game according to claim 7, wherein the operation of automatically selecting the target game role among the candidate game roles based on the predicted winning rate comprises:

obtaining weight information according to the first correlation value;

obtaining a first winning percentage evaluation value according to first historical winning percentage information of the game played by a first candidate game role among the candidate game roles matched with the at least one chosen game role and the weight information;

obtaining a second winning percentage evaluation value according to second historical winning percentage information of the game played by a second candidate game role among the candidate game roles matched with the at least one chosen game role and the weight information; and choosing the first candidate game role as the target game role according to the first winning percentage evaluation value and the second winning percentage evaluation value.

10. The system for recommending the teammate for the team game according to claim 9, wherein the operation of recommending the player to be teamed up who plans to use the target game role to play the game as the teammate according to the target game role comprises:

obtaining a player list, wherein the player list records identification information of at least one candidate player planning to play the game by using the target game role; and choosing one from the at least one candidate player as the recommended player to be teamed up according to winning percentage information of the at least one candidate player using the target game role to play the game in the past.

\* \* \* \* \*